US010677640B2

(12) United States Patent
Dehner

(10) Patent No.: US 10,677,640 B2
(45) Date of Patent: Jun. 9, 2020

(54) SCALE HAVING AN ADJUSTABLE FOOT

(71) Applicant: Bizerba SE & Co. KG, Balingen (DE)

(72) Inventor: Moritz Dehner, Hechingen (DE)

(73) Assignee: Bizerba SE & Co. KG, Balingen (DE)

(*) Notice: Subject to any disclaimer, the term of this patent is extended or adjusted under 35 U.S.C. 154(b) by 281 days.

(21) Appl. No.: 15/908,618

(22) Filed: Feb. 28, 2018

(65) Prior Publication Data
US 2018/0252573 A1    Sep. 6, 2018

(30) Foreign Application Priority Data

Mar. 2, 2017 (EP) .................................. 17158976

(51) Int. Cl.
| | |
|---|---|
| *G01D 11/24* | (2006.01) |
| *F16M 11/24* | (2006.01) |
| *G01G 21/28* | (2006.01) |
| *G01G 23/00* | (2006.01) |
| *A47B 91/02* | (2006.01) |

(52) U.S. Cl.
CPC ............ *G01G 21/28* (2013.01); *G01G 23/002* (2013.01); *A47B 91/024* (2013.01); *F16M 11/24* (2013.01); *G01D 11/245* (2013.01)

(58) Field of Classification Search
CPC ...... G01G 21/23; G01G 21/28; G01G 23/002; F16M 11/24; G01D 11/245; A47B 91/02; A47B 91/022; A47B 91/0024
See application file for complete search history.

(56) References Cited

U.S. PATENT DOCUMENTS 3,175,795 A * 3/1965 Adams ................. A47B 91/024
                                                    248/188.4
5,332,182 A * 7/1994 Weisz ...................... F16M 7/00
                                                    248/188.4
(Continued)

FOREIGN PATENT DOCUMENTS

EP     1 698 253 A1    9/2006
EP     3 001 159 A1    3/2016

OTHER PUBLICATIONS

European Search Report dated Aug. 11, 2017 of corresponding European Patent Application No. 17158976.5 (two pages).

*Primary Examiner* — Randy W Gibson
(74) *Attorney, Agent, or Firm* — Kilpatrick Townsend & Stockton LLP

(57) ABSTRACT

The invention relates to a scale having a housing and one or more adjustable feet, wherein the housing has a respective mount into which the respective adjustable foot is inserted, wherein the respective adjustable foot can be introduced into the respective mount from below, wherein the adjustable foot has a foot piece that is supported in the mount in a rotationally fixed and axially movable manner and has an adjustable spindle connected to the housing in an axial fixed and rotationally movable manner, wherein the adjustable spindle has a threaded section at its lower end with which the adjustable spindle engages into a counter-thread formed in the foot piece, and wherein a rotational movement of the adjustable spindle effects a longitudinal movement of the foot piece relative to the adjustable spindle. The adjustable spindle has a snap-in connection section at its upper end that engages an undercut formed in the respective mount while forming a snap-in connection.

17 Claims, 3 Drawing Sheets

(56) References Cited

U.S. PATENT DOCUMENTS

Figure 1:
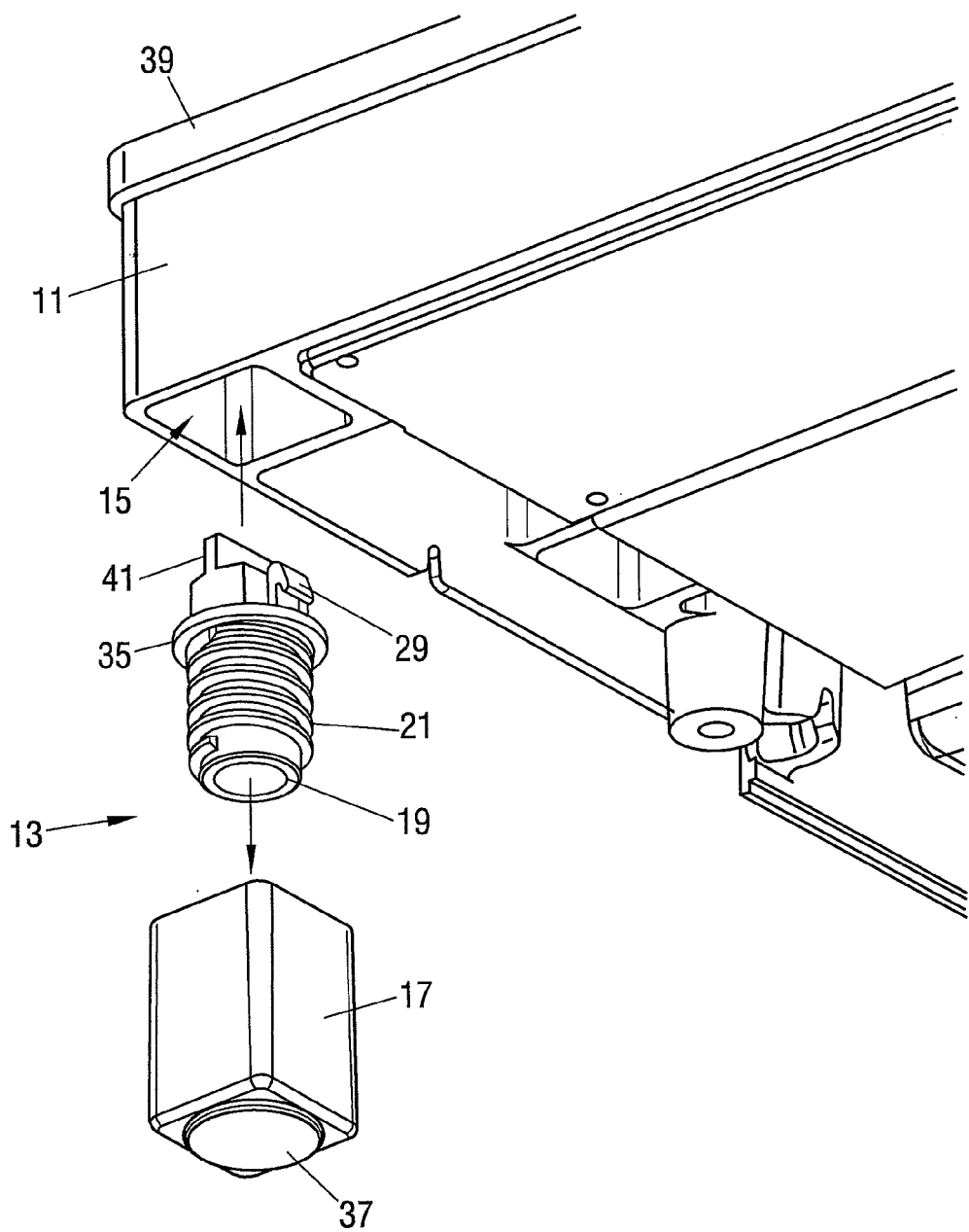

| | | | | |
|---|---|---|---|---|
| 5,653,417 A * | 8/1997 | DeBarber | ............... | F16M 7/00 |
| | | | | 177/239 |
| 6,407,351 B1 * | 6/2002 | Meyer | ..................... | F16M 7/00 |
| | | | | 177/238 |
| 7,235,746 B2 * | 6/2007 | Williamson | ........... | G01G 19/44 |
| | | | | 177/126 |
| 7,935,900 B2 * | 5/2011 | Schilling | ............... | G01G 21/00 |
| | | | | 177/126 |
| 8,351,837 B2 * | 1/2013 | Kitano | ............... | G03G 15/2057 |
| | | | | 399/333 |
| 9,046,408 B2 * | 6/2015 | Chan | ........................ | G01G 3/14 |
| 10,113,686 B2 * | 10/2018 | Kempf | ................ | G01D 11/245 |
| 2002/0084390 A1 * | 7/2002 | Parisi | ................... | A47B 91/024 |
| | | | | 248/188.8 |
| 2007/0267561 A1 * | 11/2007 | Dam | ................... | A47B 91/024 |
| | | | | 248/615 |
| 2008/0191111 A1 * | 8/2008 | Selle | .................... | A47B 91/024 |
| | | | | 248/302 |
| 2016/0084430 A1 | 3/2016 | Kempf et al. | | |

\* cited by examiner

SCALE HAVING AN ADJUSTABLE FOOT

This application claims priority to European Patent Application No. 17158976.5, filed Mar. 2, 2017, the disclosure of which is incorporated by reference herein.

The present invention relates to a scale having a housing and one or more adjustable feet, wherein the housing has a respective mount into which the respective adjustable foot is inserted, wherein the respective adjustable foot can be introduced into the respective mount from below, wherein the adjustable foot has a foot piece that is supported in the mount in a rotationally fixed and axially movable manner and has an adjustable spindle connected to the housing in an axial fixed and rotationally movable manner, wherein the adjustable spindle has a threaded section at its lower end with which the adjustable spindle engages into a counter-thread formed in the foot piece, and wherein a rotational movement of the adjustable spindle effects a longitudinal movement of the foot piece relative to the adjustable spindle.

Such a scale in which the feet are vertically adjustable to in particular align the scale horizontally is known from the document EP 3 001 159 A1. The adjustable spindle there is connected to the housing in an axially fixed and rotationally movable manner in that it is introduced from below up to an abutment in the mount, wherein its upper end engages through an opening in a horizontal housing section in this position and subsequently a leveling wheel that has a larger diameter than the opening and by which the adjustable spindle can be actuated is fixedly placed onto the upper end of the adjustable spindle.

It is the underlying object of the invention to further simplify the design and assembly of an adjustable foot of a scale.

This object is achieved by a scale having the features of claim 1 and in particular in that the adjustable spindle has a snap-in connection section at its upper end that engages an undercut formed in the respective mount while forming a snap-in connection, in particular a releasable snap-in connection.

A leveling wheel for the axial holding of the adjustable foot is therefore no longer required. Since the leveling wheel can be saved, the construction height of the scale and the costs for the adjustable foot can also be kept particularly small.

The adjustable spindle can be provided with an external thread and the foot piece can be provided with an internal thread, or vice versa. To hold the foot piece in the mount in a rotationally fixed manner, it is preferred for the outer cross-section of the foot piece and the inner cross-section of the mount cooperating therewith to respectively differ from a circular shape. The two cross-sections can in particular each be square, in particular with rounded edges.

In accordance with a preferred embodiment of the invention, the snap-in connection section has one or more bending snap-in hooks, in particular two bending snap-in hooks, that are diametrically opposite one another with respect to the longitudinal axis of the adjustable spindle. A particularly simple and simultaneously reliable snap-in connection can hereby be provided. The snap-in connection can furthermore also be simply released again by pressing the bending snap-on hooks together.

It is generally possible that the mount, for example, has a ring-shaped inner groove to form the undercut. The mount, however, preferably has a constriction, in particular a step-shaped constriction, to form the undercut for the snap-in connection section. The constriction can be formed by a radially inwardly projecting disk-shaped ring flange. The latter can be simply manufactured in that a circular opening is provided in a horizontal housing section.

The adjustable spindle preferably additionally has an actuation section at its upper end that extends from the bottom to the top through the constriction so that the adjustable spindle can be actuated from above.

In accordance with a preferred embodiment, the constriction forms an abutment for the adjustable foot, in particular the adjustable spindle, introduced into the respective mount from below. Corresponding to this, the adjustable spindle can have a radially outwardly projecting disk-shaped ring flange that forms a counter-abutment to the abutment formed by the constriction.

It can furthermore be advantageous for the foot piece to be provided with an installation surface at its lower side that is produced from a different material than the foot piece. The installation surface can, for example, be a rubber support. It can in particular be advantageous if the installation surface is received replaceably and/or is received by interference fit in a cut-out formed at the lower side of the foot piece.

A set of different installation surfaces can in particular be present that are produced from different materials and with which the foot piece can selectively be provided. An adaptation to different surfaces, in particular of different materials, onto which the scale is set can hereby be carried out.

The installation surface of rubber can also be overmolded with the foot piece and is thus not replaceable.

It is furthermore preferred if the scale has a removable load plate that covers the respective mount and the respective adjustable foot from above, with the respective mount and/or the respective adjustable foot being accessible from above with a removed load plate. A dismantling of further components of the scale is preferably not necessary. The adjustable spindle can additionally have an actuation section at its upper end that is actuable from above and that in particular comprises an upwardly directed web.

Provision can furthermore be made that the respective adjustable foot has a security against a complete unscrewing of the foot piece and the adjustable spindle so that a loss of the foot piece cannot accidentally occur.

The present invention furthermore relates to a method of inserting an adjustable foot into a mount of a housing of a scale in which a foot piece that is supportable in the mount in a rotationally fixed and axially movable manner and an adjustable spindle are combined to form the adjustable foot, wherein the adjustable spindle has a threaded section at its one end with which the adjustable spindle engages into a counter-thread formed in the foot piece, wherein a rotational movement of the adjustable spindle effects a longitudinal movement of the foot piece relative to the adjustable spindle, and wherein the adjustable spindle has a snap-in connection section at its other end and the adjustable foot is introduced into the mount of the housing of the scale from below with the snap-in connection section at the front until the snap-in connection section engages an undercut formed in the mount of the housing while forming a snap-in connection so that the adjustable spindle is connected to the housing in an axially fixed and rotationally movable manner.

Preferred embodiments of the method in accordance with the invention result analog to the preferred embodiments of the scale in accordance with the invention.

Further advantageous embodiments of the invention are described in the claims, in the description of the Figures and in the drawing.

Figure 2:
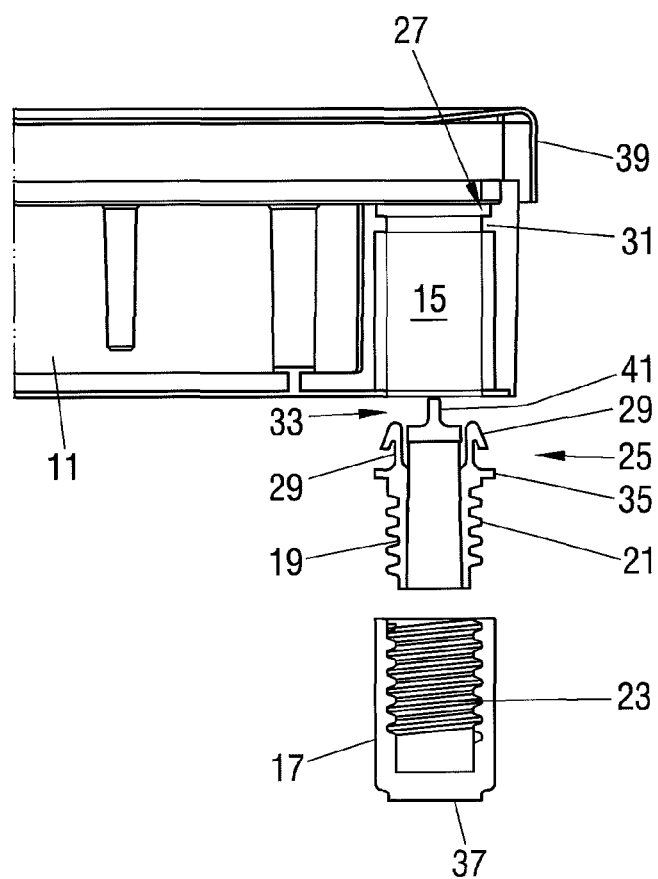

The invention will be described in the following by way of example with reference to the drawing. There are shown FIG. 1 an exploded representation of a scale in accordance with the invention of which an adjustable foot and a mount for the adjustable foot formed in a housing are shown;

FIG. 2 a plan view of the embodiment in accordance with FIG. 1; and

Figure 3:
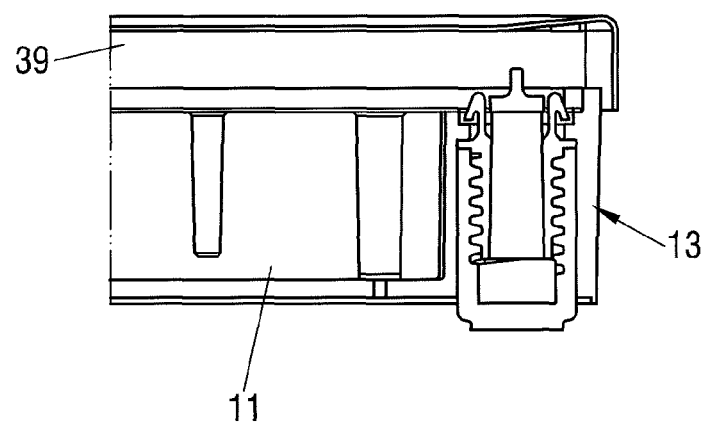

FIG. 3 the sectional representation in accordance with FIG. 2, wherein the adjustable foot is assembled and is inserted into the mount.

The scale shown in FIGS. 1 to 3 has a plurality of adjustable feet 13, preferably four adjustable feet, of which only one adjustable foot 13 is shown, to align the scale. The respective adjustable foot 13 is inserted in a respective mount 15 formed in a housing 11 of the scale. For this purpose, the adjustable foot 13 is introduced into the mount 15 from below, that is from the lower side of the scale.

The adjustable foot 13 comprises a foot piece 17 and an adjustable spindle 19. The adjustable spindle 19 is connected to the housing 11 in an axially fixed and rotationally movable manner and the foot piece 17 is supported in the mount 15 in a rotationally fixed and axially movable manner. The adjustable spindle 19 has a threaded section 21 at its lower end, in particular having an external thread that engages into a counter-thread 32 formed in the foot piece 17, in particular an internal thread. A rotational movement of the adjustable spindle 19 therefore results in a longitudinal movement of the foot piece 17 relative to the adjustable spindle 19. It is thus made possible to displace the foot piece 17 within the mount 15 so that the adjustable foot 13 is vertically adjustable.

The adjustable spindle 19 has a snap-in connection piece 25 at its upper end in the form of two bending snap-in hooks 29 that are disposed diametrically opposite one another with respect to the longitudinal axis of the adjustable spindle 19. The bending snap-in hooks 29 of the adjustable spindle 19 engage through a radially inwardly projecting disk-shaped ring flange 31 that is formed within the mount 15 and engages behind it so that a snap-in connection is formed between the adjustable spindle 19 and the housing 11. The upper side of the ring flange 31 that represents a constriction of the mount 15 thus forms an undercut 27 for the adjustable spindle 19 or its bending snap-in hooks 29 introduced into the mount 15 from below.

The ring flange 31 simultaneously represents an abutment for the adjustable spindle 19 introduced into the mount 15 from below that for this purpose is provided with a counter-abutment in the form of a radially outwardly projecting disk-shaped ring flange 35 that is arranged in the axial direction of the adjustable spindle 19 between the threaded section 21 and the bending snap-in hooks 29.

The adjustable spindle 19 furthermore has an actuation section 33 at its upper end that likewise extends upwardly through the ring flange 31 of the housing 11 and can thus be actuated from above. The actuation section 33 has an upwardly directed web 41 for this purpose that can be gripped and rotated by two fingers of a hand. The actuation section 33 is accessible when a load plate 39 of the scale is removed that otherwise covers the housing 11 and the mount 15 together with the adjustable foot 13 from above.

At its lower side, the foot piece 17 can be provided with a separate, replaceable installation surface 37 that can be produced from a different material, for example, from rubber, than the foot piece 17 to ensure a reliable hold on a surface on which the scale is placed. A plurality of installation surfaces 37 can in particular be provided that comprise different materials to be able to carry out a corresponding adaptation to the respective material of the surface. The installation surface 37 of rubber could also be overmolded with the material of the foot piece 17 in an rubber injection molding process. The installation surface 37 and the foot piece 17 are then fixedly connected to one another and are replaceable as one part.

The adjustable foot of the described scale is particularly simple in design and installation.

REFERENCE NUMERAL LIST

11 housing
13 adjustable foot
15 mount
17 foot piece
19 adjustable spindle
21 threaded section
23 counter-thread
25 snap-in connection section
27 undercut
29 bending snap-in hook
31 ring flange, abutment
33 actuation section
35 ring flange, counter-abutment
37 installation surface
39 load plate
41 web

The invention claimed is:

1. A scale having a housing and one or more adjustable feet,
    wherein the housing has a respective mount into which the respective adjustable foot is inserted, wherein the respective adjustable foot can be introduced into the respective mount from below;
    wherein the adjustable foot has a foot piece that is supported in the mount in a rotationally fixed and axially movable manner and has an adjustable spindle that is connected to the housing in an axially fixed and rotationally movable manner;
    wherein the adjustable spindle has a threaded section at its lower end with which the adjustable spindle engages into a counter-thread formed in the foot piece, wherein a rotational movement of the adjustable spindle effects a longitudinal movement of the foot piece relative to the adjustable spindle; and
    wherein the adjustable spindle has a snap-in connection section at its upper end that engages an undercut formed in the respective mount while forming a snap-in connection.

2. The scale in accordance with claim 1,
    wherein the snap-in connection section has one or more bending snap-in hooks.

3. The scale in accordance with claim 2,
    wherein the snap-in connection section has two bending snap-in hooks disposed diametrically opposite one another with respect to the longitudinal axis of the adjustable spindle.

4. The scale in accordance with claim 1,
    wherein the mount has a constriction to form the undercut for the snap-in connection section.

5. The scale in accordance with claim 4,
    wherein the mount has a step-shaped constriction.

6. The scale in accordance with claim 4,
    wherein the constriction is formed by a radially inwardly projecting disk-shaped ring flange.

7. The scale in accordance with claim 4,
    wherein the adjustable spindle additionally has an actuation section at its upper end that extends from the bottom to the top through the constriction so that the adjustable spindle can be actuated from above.

8. The scale in accordance with claim 4,
wherein the constriction forms an abutment for the adjustable foot introduced into the respective mount.

9. The scale in accordance with claim 8,
wherein the constriction forms an abutment for the adjustable spindle.

10. The scale in accordance with claim 8,
wherein the adjustable spindle has a radially outwardly projecting disk-shaped ring flange that forms a counter-abutment to the abutment.

11. The scale in accordance with claim 1,
wherein the foot piece is provided with an installation surface at its lower side that is produced from a different material than the foot piece.

12. The scale in accordance with claim 11,
wherein a set of different installation surfaces are present that are produced from different materials and with which the foot piece can selectively be provided.

13. The scale in accordance with claim 1,
wherein the scale has a removable load plate that covers the respective mount and the respective adjustable foot from above, with the respective mount and/or the respective adjustable foot being accessible from above with a removed load plate.

14. The scale in accordance with claim 1,
wherein the adjustable spindle additionally has an actuation section at its upper end that is actuable from above.

15. The scale in accordance with claim 14,
wherein the actuation section comprises an upwardly directed web.

16. The scale in accordance with claim 1,
wherein the respective adjustable foot has a security against a complete unscrewing of the foot piece and the adjustable spindle.

17. A method of inserting an adjustable foot into a mount of a housing of a scale, in which
a foot piece supportable in the mount in a rotationally fixed and axially movable manner and an adjustable spindle are assembled to form the adjustable foot, wherein the adjustable spindle has a threaded section at its one end with which the adjustable spindle engages into a counter-thread formed in the foot piece, wherein a rotational movement of the adjustable spindle effects a longitudinal movement of the foot piece relative to the adjustable spindle, and wherein the adjustable spindle has a snap-in connection section at its other end; and
the adjustable foot is introduced into the mount of the housing of the scale from below with the snap-in connection section at the front until the snap-in connection section engages an undercut formed in the mount of the housing while forming a snap-in connection so that the adjustable spindle is connected to the housing in an axially fixed and rotationally movable manner.

* * * * *